United States Patent
Franz

(10) Patent No.: US 9,068,656 B2
(45) Date of Patent: Jun. 30, 2015

(54) SEAL AND SEAL ARRANGEMENT

(75) Inventor: Martin Franz, Wannweil (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 293 days.

(21) Appl. No.: 13/384,599

(22) PCT Filed: Jul. 26, 2010

(86) PCT No.: PCT/DE2010/050051
§ 371 (c)(1),
(2), (4) Date: Jan. 18, 2012

(87) PCT Pub. No.: WO2011/012129
PCT Pub. Date: Feb. 3, 2011

(65) Prior Publication Data
US 2012/0112419 A1    May 10, 2012

(30) Foreign Application Priority Data

Jul. 30, 2009   (DE) .......................... 10 2009 028 131

(51) Int. Cl.
*F16J 15/32*   (2006.01)
*F16J 15/34*   (2006.01)

(52) U.S. Cl.
CPC .......... *F16J 15/3456* (2013.01); *F16J 15/3224* (2013.01); *F16J 15/3216* (2013.01); *F16J 15/322* (2013.01)

(58) Field of Classification Search
CPC ............................... F16J 15/32; F16J 15/3244
USPC .......................................... 277/551, 564, 584
See application file for complete search history.

(56) References Cited

U.S. PATENT DOCUMENTS

| | | | |
|---|---|---|---|
| 2,743,950 A | 1/1956 | Helfrecht | |
| 3,455,564 A | 7/1969 | Dega | ........................ F16J 15/32 |
| 4,102,538 A | 7/1978 | Bertin | |
| 4,172,599 A | 10/1979 | Forch | |
| 4,491,332 A * | 1/1985 | Zumbusch | .................... 277/558 |
| 5,244,215 A * | 9/1993 | Cather et al. | .................. 277/309 |

(Continued)

FOREIGN PATENT DOCUMENTS

| | | | |
|---|---|---|---|
| CN | 1417504 | 5/2003 | |
| CN | 1417504 A | 5/2003 | ............... F16J 15/32 |

(Continued)

*Primary Examiner* — Vishal Patel
(74) *Attorney, Agent, or Firm* — Paul Vincent

(57) ABSTRACT

A seal for sealing a sealing surface 2 between a first machine part 1 having a seal accommodating structure, preferably a groove, and a second machine part 3, which defines the sealing surface 2 and can be moved relative to the first machine part 1. The seal seals a high-pressure area between the machine parts 1, 3 from a low-pressure area and has a retaining element 5 for positionally fixing the seal in the seal accommodating structure, and a sealing lip 6 which is formed on the retaining element 5 and is made from an elastomeric material having a sealing edge 7 formed at a free end of the sealing lip 6 for abutment on the sealing surface 2. The sealing lip 6 has a high-pressure surface area 10 bordering the high-pressure area, and a low-pressure surface area 11 bordering the low-pressure area. The seal has a supporting element 15, wherein the supporting element 15 forms a support of the sealing lip 6 on the low-pressure surface side, the support extending substantially parallel to the sealing edge 7, with the support being arranged between the sealing edge 7 and the retaining element 5.

8 Claims, 4 Drawing Sheets

(56) References Cited

U.S. PATENT DOCUMENTS

| | | | | |
|---|---|---|---|---|
| 2002/0003337 A1* | 1/2002 | Yamada et al. | .............. | 277/559 |
| 2003/0075872 A1* | 4/2003 | Ikeda | ............... | 277/560 |
| 2005/0098959 A1* | 5/2005 | Uhrner | ............... | 277/500 |
| 2008/0272551 A1* | 11/2008 | Sanada | ............... | 277/361 |

FOREIGN PATENT DOCUMENTS

| | | | | |
|---|---|---|---|---|
| CN | 101418860 | 4/2009 | | |
| CN | 101418860 A | 4/2009 | .............. | F16J 15/16 |
| DE | 948 464 | 8/1956 | | |
| DE | 10 88 300 | 9/1960 | | |
| DE | 32 12 476 | 11/1983 | | |
| DE | 10 2008 017347 | 10/2009 | | |
| EP | 1 533 550 | 5/2005 | | |
| EP | 1 760 371 | 3/2007 | | |
| EP | 1760371 A1 | 3/2007 | .............. | F16J 15/32 |
| JP | 2000-346203 | 12/2000 | | |
| JP | 2000-346203 A | 12/2000 | .............. | F16J 15/32 |
| JP | 2004-036631 | 2/2004 | | |
| JP | 2004-36631 A | 2/2004 | .............. | F16J 15/32 |
| JP | 2007-125192 | 5/2007 | | |
| JP | 2007-125192 A | 5/2007 | ............ | D05B 71/00 |
| WO | 2005/036033 | 4/2005 | | |

* cited by examiner

SEAL AND SEAL ARRANGEMENT

This application is the national stage of PCT/DE2010/050051 filed on Jul. 26, 2010 and also claims Paris Convention priority of DE 10 2009 028 131.2 filed on Jul. 30, 2009.

BACKGROUND OF THE INVENTION

The invention concerns a sealing arrangement with a seal for sealing a sealing surface between a first machine part having a seal accommodating structure, preferably a groove, and a second machine part, which comprises the sealing surface and can be moved relative to the first machine part, wherein the seal seals a high-pressure area between the machine parts from a low-pressure area.

Sealing arrangements of this type comprise a seal with a retaining element for positionally fixing the seal in the seal accommodating structure, and a sealing lip of elastomeric material, i.e. rubber-elastic material such as e.g. polyurethane or rubber, which is formed on the retaining element and has a sealing edge formed at a free end of the sealing lip for abutment on the sealing surface. The sealing lip has a high-pressure surface area bordering the high-pressure area, and a low-pressure surface area bordering the low-pressure area. The seals are normally designed as sealing rings and can be used both as rotary seals (radial shaft seal) and also as piston seals, i.e. a translational seal. When they are used as a rotary seal, one of the two machine parts is designed as a shaft that is rotatably supported inside a feed-through in the other machine part. When they are used as piston seals, the two machine parts move in an axial direction back and forth relative to each other. The seals can therefore be used as rod seals or piston seals for sealing purposes in hydraulic applications, pneumatic applications, e.g. pneumatic cylinders or valves and/or rotary seals, e.g. in high-pressure applications.

A seal of this type is normally inserted between two machine parts, which are moved in an axial direction relative to each other and/or in a rotary fashion, in a groove in a surface of one of the machine parts, wherein this surface is disposed opposite to a sealing surface formed by a surface of the second machine part. There is a sealing gap to be sealed between those surfaces. In the case of a sealing ring, the two surfaces are aligned concentrically with respect to one another. In this case, the groove is normally disposed in the corresponding surface of the outer machine part. The groove may, however, also be disposed in the inner machine part. The resilient sealing lip acts like a spring between the sealing edge and the retaining element such that the sealing edge abuts the sealing surface in a pretensioned state. The retaining element is dimensioned in such a fashion that it allows the seal to be preferably positionally fixed e.g. on the groove bottom.

When a seal of this type is used e.g. in a hydraulic cylinder, pneumatic cylinder or shaft seal such as e.g. a drive shaft of an engine, the seal is loaded by a pressurized medium on its high-pressure surface area during operation, i.e. by a fluid such as e.g. oil and/or air, which is located in the high-pressure area within the cylinder or the engine. In order to achieve the desired sealing effect, the seal is inserted in a pretensioned state into the seal accommodating structure.

Since the sealing lip is elastic, pressurization of the high-pressure surface area increases the pressure with which the sealing edge is pressed onto the sealing surface. In the static case, this increases the sealing force. In the dynamic case, the sealing edge might be deformed by the increased sealing force such that the sealing function of the sealing edge is reduced due to an unfavorable pressure distribution. The sealing lip may moreover be deformed in such a fashion that the sealing edge is lifted off from the sealing surface. The latter may happen, in particular, when the sealing lip is elastically and/or plastically deformed on the side of its low-pressure surface area, i.e. its surface area facing towards the outside, low-pressure area that usually borders the ambient air, and therefore fails to hold form.

These malfunctions of the seal during operation, e.g. of a pneumatic cylinder or engine, cause leakages in the high-pressure area and/or can cause a break in the lubricating film between the sealing surfaces due to undesired deformation in the sealing edge area, such that the surface of the sealing surfaces might be subjected to increased wear.

DE 32 12 476 C1 discloses a sealing arrangement with a seal with improved wear resistance. The seal has a supporting element disposed at a distance from the second machine part, the supporting element forming a support of the sealing lip on the low-pressure surface side. The support divides a high-pressure surface area of the sealing lip into a partial surface on the sealing edge side and a partial surface on the retaining element side. A center of rotation is thereby generated between the sealing edge and the supporting element and also between the supporting element and the retaining element, about which center of rotation the sealing lip can be pivoted when the shaft runs out with respect to the retaining element. This reduces wear of the sealing edge in case of shaft runouts. When the high-pressure surface area of the sealing lip is pressurized, the sealing lip is deflected about the center of rotation on the sealing edge side with respect to the retaining element, thereby pressing the sealing edge thereof against the sealing surface in dependence on the pressure that only acts on the partial surface on the sealing edge side.

DE 25 46 588 A1 discloses a sealing arrangement with a sealing ring comprising a sealing lip formed on a retaining element, the sealing lip being provided with a sealing edge at the free end thereof. The sealing ring is clamped between the sealing edge and the retaining element between a radially inner and a radially outer annular supporting element. The radially inner supporting element thereby forms a support of the sealing lip on the low-pressure surface side, the support substantially extending parallel to the sealing edge, wherein the support divides the high-pressure surface area of the sealing lip into a partial surface on the retaining element side and a partial surface on the sealing edge side. The low-pressure surface area of the sealing lip borders a free space delimited by the sealing lip and a machine part to be sealed between the support and the retaining element, into which free space the sealing lip can be pressed due to its deformation. The partial surface of the high-pressure surface area on the retaining element side is thereby larger than the partial surface on the sealing edge side. The sealing lip of this sealing arrangement can easily follow shaft runouts of a shaft to be sealed. In the pressure-activated state of the seal, the sealing lip is deformed into the free space, thereby axially shifting the sealing lip, which is reinforced by the support, with the sealing edge. When the pressure increases, the sealing edge is always pressed with increased force against the sealing surface of the shaft, thereby i.a. increasing wear of the sealing ring.

EP 1 760 371 A1 discloses a sealing arrangement with a radial shaft seal, in which a supporting element forms a support of the sealing lip on the low-pressure surface side, the sealing lip being arranged between the sealing edge and the retaining element. The support thereby divides a high-pressure surface area of the sealing lip into a partial surface on the retaining element side and a partial surface on the sealing edge side. Pressurization of the high-pressure surface area of the sealing lip of this seal may also load the sealing edge and cause great wear, in particular, in case of pressure peaks.

WO 2005/036033 A1 discloses a sealing arrangement, in which a small gap is formed between a supporting element forming a support of the sealing lip on the low-pressure side, and the sealing lip. The sealing edge could initially be relieved upon pressurization of its high-pressure surface area, thereby deforming the sealing lip into the free space. When the pressure further increases, the sealing lip abuts the supporting element with its full surface and the sealing edge is pressed against its associated sealing surface with an increasing force.

Comparable sealing arrangements are disclosed in DE 10 88 300 B, U.S. Pat. No. 2,743,950 A and DE 10 2008 017347 A1.

It is the underlying purpose of the invention to provide a sealing arrangement, which eliminates the disadvantages of prior art, in particular, reduces wear of the seal at the same time providing great reliability of the sealing function.

This object is achieved by the recitations of the independent claims. The dependent claims represent preferred embodiments of the invention.

SUMMARY OF THE INVENTION

The sealing arrangement in accordance with the invention comprises a first machine part having a seal accommodating structure, preferably a groove, and a second machine part, which comprises a sealing surface and can be moved relative to the first machine part, and a seal for sealing a sealing surface between the first machine part and the second machine part. The seal thereby seals a high-pressure area between the machine parts from a low-pressure area. The high-pressure area designates the area with higher pressure, i.e. the terms high-pressure area and low-pressure area are to be understood relative to each other. The pressure in the high-pressure area does not need to be an absolute high pressure, e.g. with respect to atmospheric pressure. It is e.g. possible that the pressure in the low-pressure area is an excess pressure compared to atmospheric pressure, wherein, in this case, the pressure in the high-pressure area would be higher than the excess pressure.

During operation of a sealing arrangement with a seal, the pressure ratios may also change, e.g. the positions of the two pressure areas with respect to sealing lip and sealing edge may be interchanged. High-pressure area in this case means the instantaneous area with a pressure that is higher than in the low-pressure area. The seal has a retaining element which positionally fixes the seal in the seal accommodating structure. A sealing lip is formed on the retaining element and is made from an elastomeric material having a preferably dynamic sealing edge formed at a free end of the sealing lip which abuts the sealing surface. An edge of the sealing lip, which is formed for abutment on the sealing surface for sealing a sealing gap between the sealing surface and the seal accommodating structure, is thereby designated as sealing edge. The sealing lip has a high-pressure surface area bordering the high-pressure area, and a low-pressure surface area bordering the low-pressure area. The high-pressure surface area and the low-pressure surface area are disposed such that they are at least partially opposite to each other. The low-pressure surface area borders a free space towards which or into which the sealing lip can be pressed due to its deformation. The free space may thereby be filled e.g. with air. It may also be filled with a material that can be elastically compressed. In accordance with the invention, the free space is delimited by the low-pressure surface area of the sealing ring and also by the second machine part.

In the area of its sealing lip, the seal has only one supporting element, which forms a support of the sealing lip on the low-pressure surface side, the support extending substantially parallel to the sealing edge and being disposed between the sealing edge and the retaining element.

The supporting element is supported on the low-pressure surface side, thereby preventing the sealing lip and therefore the sealing edge from being pressed onto the sealing surface with an excessive force. The support divides the sealing lip and therefore also its high-pressure surface area into an area on the sealing edge side and an area on the retaining element side. In accordance with the invention, the partial surface of the high-pressure surface area on the retaining element side is larger than the partial surface on the sealing edge side. When the high-pressure surface area is pressurized, the pressure may exert a tilting moment onto the sealing lip, which acts about the support and relieves the sealing edge. This tilting moment causes tensile stresses within the material of the sealing lip, which relieve the sealing edge.

In consequence thereof, the inventive support prevents deformation of the sealing lip that would interfere with the sealing effect of the sealing edge, thereby preventing the sealing edge from exerting an undesired excess pressure onto the sealing surface.

The seal is designed in an annular shape in the form of a radial shaft sealing ring. For this reason, the inventive seal can be used e.g. as a rotary seal.

The supporting element is advantageously partially embedded in the sealing lip. The embedding thereby forms a surface of the sealing lip that defines an axis of rotation, about which the tilting moment can act.

The sealing lip may be designed to be reinforced by material in its area bordering the support, i.e. the sealing lip may be thicker at that location, thereby preventing undesired deformation.

In a very simple embodiment, the supporting element has a circular cross-section. When the supporting element has a substantially T-shaped cross-section, wherein the cross piece of the T at least partially projects past the low-pressure surface area, the sealing lip is reinforced in the area bordering the cross piece. The supporting element may have any cross-sectional shapes that have a supporting effect on the sealing lip in the direction of the supporting element.

The retaining element advantageously has a reinforcing element which preferably has an L-shaped cross-section. The reinforcing element may thereby be produced e.g. from metal or a rigid composite material. The reinforcing element largely prevents deformation of the retaining element during operation of the machine parts. It moreover ensures exact and secure fit in the seal accommodating structure.

When the supporting element directly joins the reinforcing element or is designed in one piece with the reinforcing element, with the support being formed by a free end of the reinforcing element, insertion of the seal into the seal accommodating structure is greatly facilitated, since the overall seal can then be inserted in the form of one single component in only one work step. Slipping of the supporting element within the sealing arrangement is also prevented.

The reinforcing element is advantageously at least partially surrounded by the elastomeric material of the sealing lip such that the reinforcing element is reliably retained within the retaining element, thereby ensuring permanent positioning of the sealing lip.

The inventive seal can be produced in a simple and inexpensive fashion by producing the supporting element and/or the reinforcing element from metal or plastic material, e.g.

polytetrafluoroethylene (PTFE) or ceramic material. The supporting element is therefore designed as a rigid element.

An inventive sealing arrangement has a first machine part comprising a seal accommodating structure, preferably a groove, and a second machine part, which comprises a sealing surface and can be moved relative to the first machine part, and also an inventive seal that is inserted into the seal accommodating structure. The seal is disposed with its retaining element in the seal accommodating structure such that it is fixed in position. The sealing edge of the seal abuts the sealing surface in a pretensioned state due to the elasticity of the elastomeric material of the sealing lip of the seal. The seal seals a high-pressure area between the machine parts against a low-pressure area.

The inventive supporting element of the seal forms a support of the sealing lip on the low-pressure surface side, i.e. lying on a low-pressure surface area of the sealing lip, the support extending substantially parallel to the sealing edge. Since the support is arranged between the sealing edge and the retaining element, a force, e.g. a pressure, acting on the high-pressure surface area of the sealing lip may exert a tilting moment on the sealing lip that relieves the sealing edge.

BRIEF DESCRIPTION OF THE DRAWING

The invention is explained in more detail below by means of embodiments with reference to the drawings.

DESCRIPTION OF THE PREFERRED EMBODIMENT

The illustrated figures show the inventive subject matter in highly schematic views and are not to be taken to scale. The individual components of the inventive subject matter are shown in such a fashion that their construction is clearly displayed.

Figure 6:
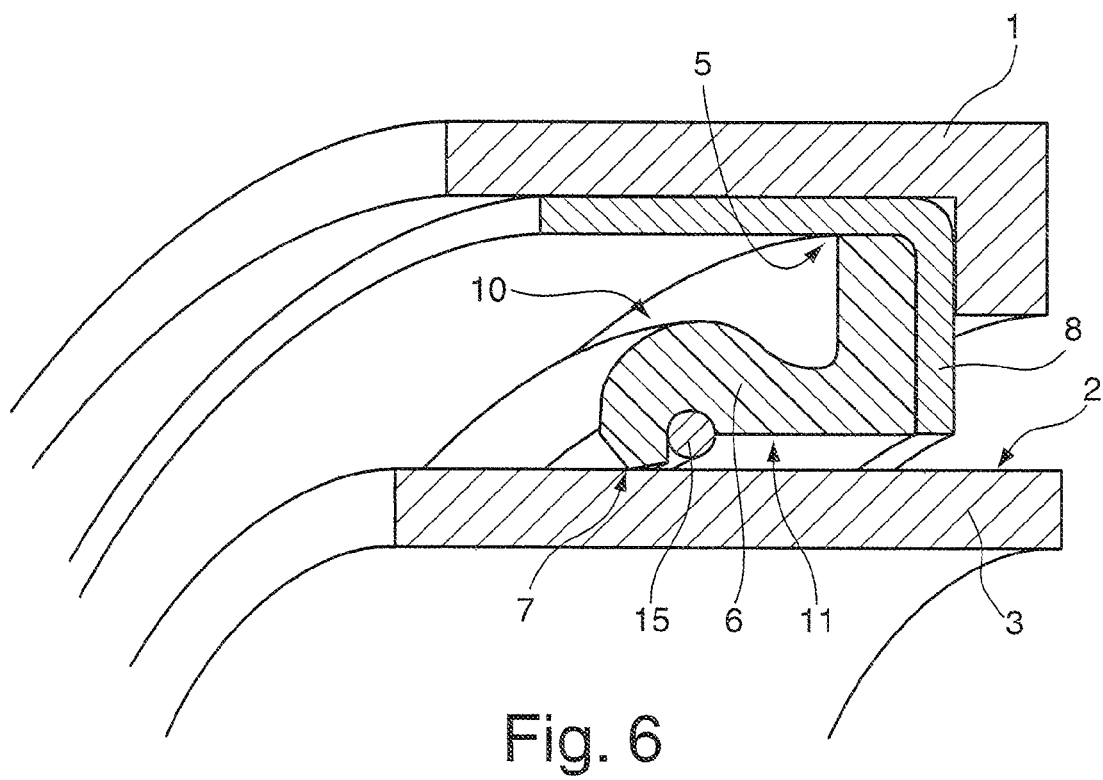
FIG. 6 shows a perspective cross-sectional view in accordance with FIG. 1 of a section of an inventive sealing arrangement with an inventive seal being designed as a sealing ring.

FIGS. 1 through 5 each show cross-sectional views of an inventive sealing arrangement, wherein only one half of the cross-section is shown, which is symmetrical with respect to an axis of rotation. The sealing arrangements each have a first machine part 1 and a second machine part 3, which comprises a sealing surface 2 to be sealed and can be moved relative to the first machine part 1. The first machine part 1 has a seal accommodating structure having an angular contact surface for abutment of a retaining element 5 of an inventive seal designed as a sealing ring for positionally fixing the seal in the seal accommodating structure. A sealing lip 6 having a sealing edge 7 follows each retaining element 5. The retaining element 5 of each seal has one reinforcing element 8, wherein the reinforcing element 8 of the embodiments of FIGS. 1 through 11 has a substantially L-shaped cross-section. The reinforcing element 8 of the embodiments of FIGS. 6 and 7 is completely surrounded by the elastomeric material of the sealing lip 6. The retaining element 5 of these embodiments is therefore designed in the form of a reinforcing element 8 that is surrounded by the elastomeric material.

The seal seals each high-pressure area between the machine parts 1, 3 from a low-pressure area. In the figures, the high-pressure area (H) is arranged on the left-hand side of the illustration and the low-pressure area (N) is arranged on the right-hand side, in each case. The high-pressure area is formed e.g. by the interior of an engine housing or a pressure cylinder, which normally contain oil. The seal is therefore used to prevent oil from leaking out of such an interior.

Each sealing lip 6 of elastomeric material that is formed on the retaining element 5 comprises the sealing edge 7 formed at a free end for abutment on the sealing surface 2. A high-pressure surface area 10 bordering the high-pressure area and a low-pressure surface area 11 disposed partially opposite to the high-pressure surface area 10 and bordering the low-pressure area are formed on the sealing lip 6.

Each seal has a supporting element 15, wherein the supporting element 15 forms a support of the sealing lip 6 on the low-pressure surface side, the support extending substantially parallel to the sealing edge 7. The support is arranged between the sealing edge 7 and the retaining element 5. When the high-pressure surface area 10 is pressurized, the compressive forces generated by the pressure acting on the surface areas of the high-pressure surface area 10 on both sides of the support exert a tilting moment on the sealing lip 6, which acts about the support and relieves the sealing edge 7. This means that the compressive forces generate tensile stresses within the sealing lip. The tilting moment is symbolically illustrated in FIG. 1 by a curved arrow 20. In order to ensure that the tilting moment acts in the desired direction, i.e. such that it relieves the sealing edge 7, the support is positioned in such a fashion that the partial surfaces of the high-pressure surface area 10 of the sealing lip 6, i.e. the surface onto which pressure forces act in the high-pressure area, have different sizes on both sides of the support. The partial surface of the retaining element side is thereby larger than the partial surface on the sealing edge side.

Figure 1:
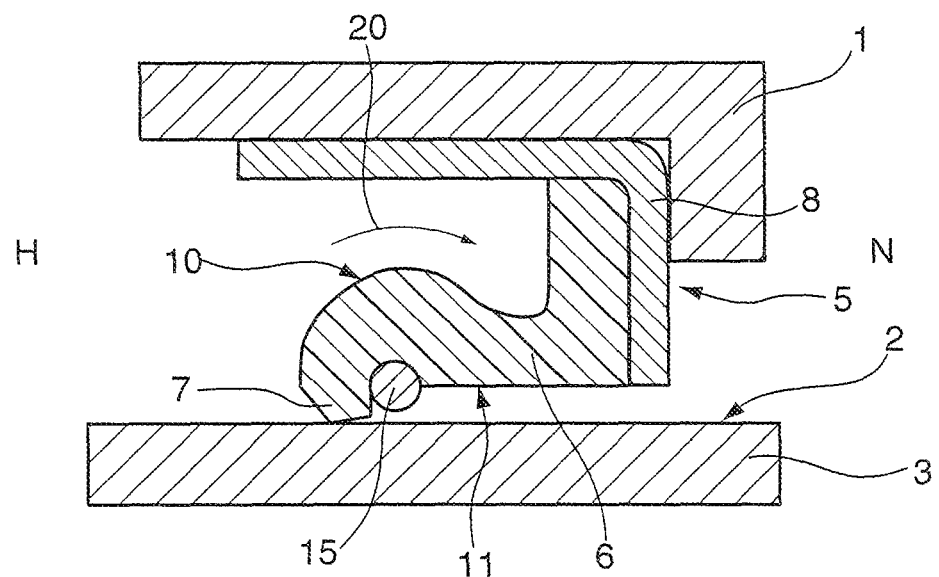
FIGS. 1 through 5 each show a cross-section through an inventive sealing arrangement, in which a supporting element prevents the sealing edge from being subjected to an excessive force.
Figure 2:
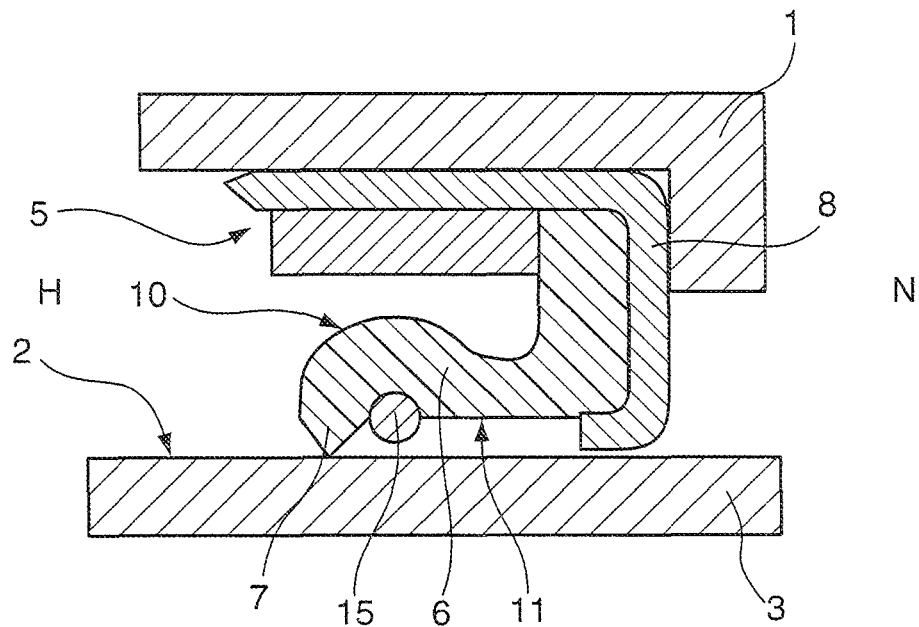
Figure 3:
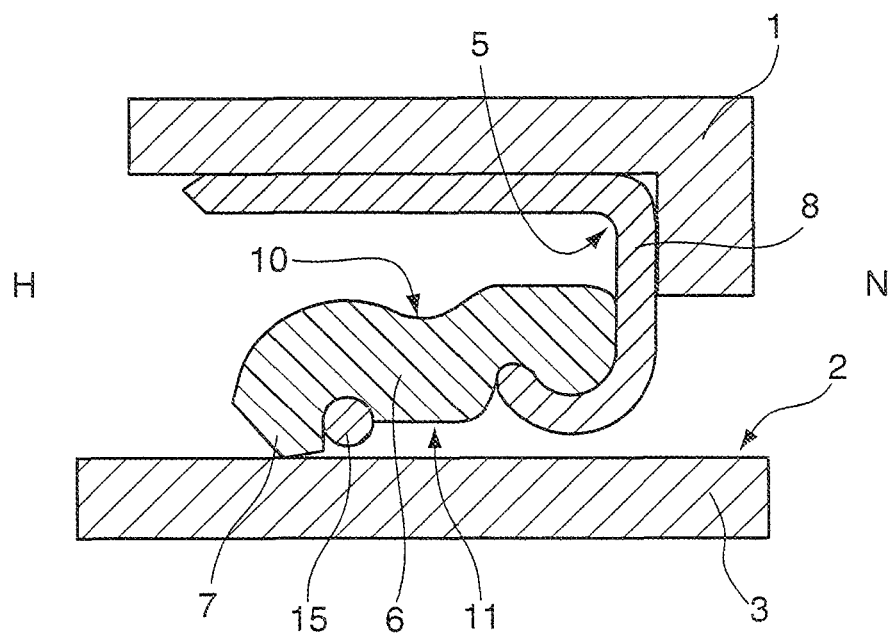
Figure 4:
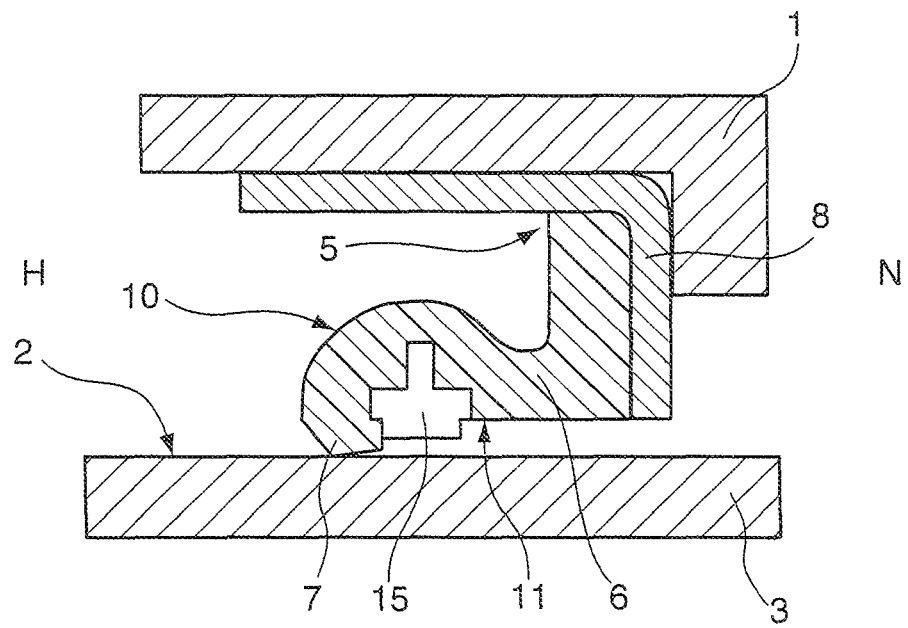
Figure 5:
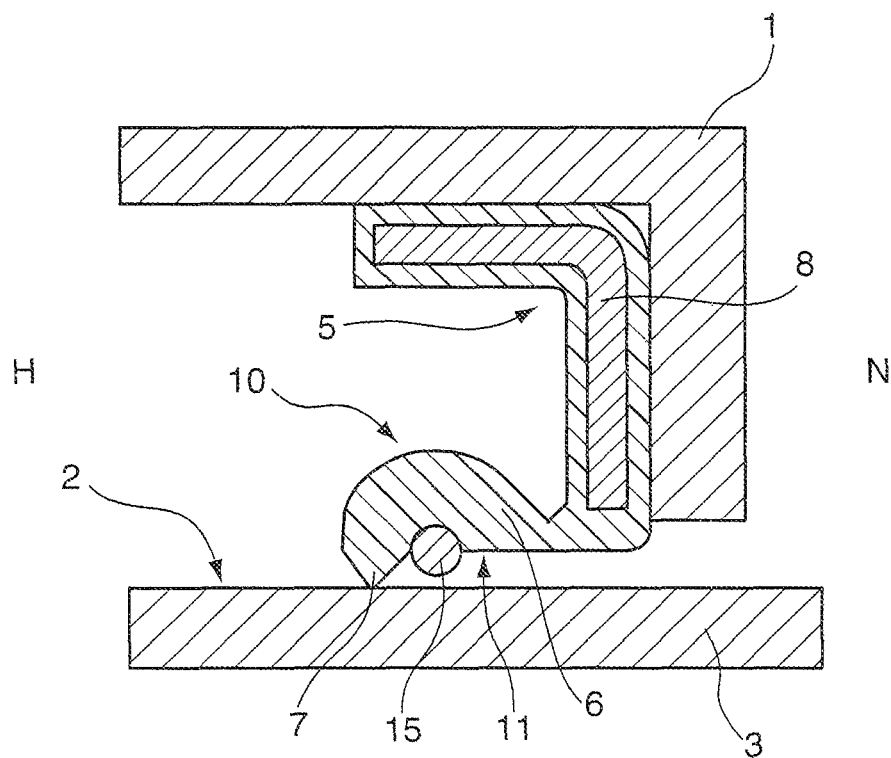

The sealing lip 6 of the embodiment of the seal in accordance with FIG. 1 is reinforced with material in its area bordering the support formed by the supporting element 15. The material of the sealing lip 6 is thicker at that location than in the area of the sealing lip 6 bordering the retaining element 5.

In the embodiments of the inventive seals in accordance with FIGS. 1 through 5, the supporting element 15 is designed in the form of a ring e.g. of steel that is offset from the retaining element 5. The supporting elements 15 have a circular cross-section except for the seal in accordance with FIG. 4. In contrast thereto, the supporting element 15 in accordance with FIG. 4 has a substantially T-shaped cross-section. The cross piece of the T thereby partially protrudes past the low-pressure surface area 11 of the sealing lip 6. Each supporting element 15 is partially embedded in the sealing lip 6. The sealing lip 6 and the supporting element 15 thereby do not need to form a solid, i.e. material-bonding interconnection.

FIG. 6 shows a perspective cross-sectional view in accordance with FIG. 1 of a section of an inventive sealing arrangement. The inventive seal is designed as a sealing ring. The perspective view of the figure shows that the support formed by the supporting element 15 extends parallel to the sealing edge 7. This means that the sealing edge 7 of a sealing ring and the support form circles which extend concentrically with respect to one another. The second machine part 3 is designed in the form of a hollow cylinder. This hollow cylinder may e.g. be shrunk onto a drive shaft of an engine. The hollow cylinder itself may also be used as a hollow shaft. The second machine part 3 may, of course, also be designed as a solid metal cylinder, i.e. for example represent a drive shaft of an engine.

The invention is not limited to the above-stated embodiments. Rather a number of variants are feasible, which utilize the features of the invention although the embodiments may be fundamentally different.

I claim:

1. A seal, the seal structured and dimensioned for incorporation into a sealing arrangement for sealing a pressurized medium, the sealing arrangement having a first machine part defining a seal accommodating structure or a groove and a second machine part having a sealing surface, the seal accommodating structure or groove defining a groove bottom and a groove side, wherein the first machine part has a high-pressure side at which the pressurized medium is located and a low-pressure side at which the groove side is disposed, wherein the first and the second machine parts are movable with respect to each other, the seal thereby having an annular shape of a radial shaft seal, the seal comprising:

a retaining element, said retaining element fixing a position of the seal within the seal accommodating structure to seat against the groove bottom and the groove side; a sealing lip formed on said retaining element and made from an elastomeric material, said sealing lip having a sealing edge formed at a free end thereof, said sealing edge abutting the sealing surface in a pretensioned state due to an elasticity of said elastomeric material of said sealing lip to seal the high-pressure side between the first and second machine parts from the low-pressure side, wherein said sealing lip has a high-pressure surface area bordering the high-pressure side and contacting the pressurized medium, and a low-pressure surface area bordering the low-pressure side, said high-pressure surface area extending radially within and at a separation from the groove bottom to define a gap within which the pressurized medium is located; and one single rigid supporting element disposed proximate said sealing lip and radially within said high-pressure surface area, said supporting element forming a support for the sealing lip proximate said low-pressure surface area, said support extending substantially parallel to said sealing edge and being disposed between said sealing edge and said retaining element, wherein said high-pressure surface area has a convex shape with a first partial surface directly bordering said gap and extending axially from a location of said support towards the high-pressure side and a second partial surface directly bordering said gap and extending axially from said location of said support towards the low pressure side, wherein said low-pressure surface area of said sealing lip borders a free space between said support and said retaining element into which said sealing lip can be pressed in response to deformation thereof, the free space being delimited by said low-pressure surface area of said sealing lip and the second machine part, the free space thereby extending continuously from said sealing edge, past said support and to said retaining element, no portion of the sealing edge and no portion of the retaining element thereby being located beneath the supporting element, wherein said second partial surface of said high-pressure surface area is larger than said first partial surface and, in consequence thereof, a tilting moment is exercised on said sealing lip about said support to relieve said sealing edge in response to pressurization of said first partial surface and said second partial surface of said high-pressure surface area by the pressurized medium in contact therewith.

2. The seal of claim 1, wherein said supporting element is at least partially embedded in said sealing lip.

3. The seal of claim 1, wherein said sealing lip is reinforced with material in an area thereof bordering said support.

4. The seal of claim 1, wherein said supporting element has a circular cross-section or a substantially T-shaped cross-section, wherein a cross piece of a T at least partially projects past said low-pressure surface area.

5. The seal of claim 1, wherein said retaining element has a reinforcing element.

6. The seal of claim 5, wherein said reinforcing element has an L-shaped cross-section.

7. The seal of claim 5, wherein said reinforcing element is at least partially enclosed by said elastomeric material of said sealing lip.

8. The seal of claim 1, wherein said supporting element and/or said reinforcing element are made from metal, plastic or a ceramic material.

* * * * *